United States Patent

Körner et al.

[11] 3,948,572
[45] Apr. 6, 1976

[54] TWIN TRACK LAYING CHAIN

[75] Inventors: Otto Körner, Wermelskirchen; Manfred Boms, Dabringhausen; Klaus Spies, Remscheid, all of Germany

[73] Assignee: DIEHL, Nurnberg, Germany

[22] Filed: Jan. 16, 1975

[21] Appl. No.: 541,435

[30] Foreign Application Priority Data
Jan. 16, 1974  Germany............................ 2401841
Jan. 16, 1974  Germany............................ 7401304

[52] U.S. Cl. ................................. 305/57; 180/5 R
[51] Int. Cl.² ........................................ B63D 55/20
[58] Field of Search ............. 305/57, 56, 52, 58, 18, 305/50, 53, 16, 17; 180/9, 9.2 R, 5 R

[56]  References Cited
UNITED STATES PATENTS
2,339,273   1/1944   Knox................................. 305/57 X
2,389,624   11/1945   Knox................................. 305/57 X

*Primary Examiner*—Philip Goodman
*Attorney, Agent, or Firm*—Walter Becker

[57]  ABSTRACT

A twin track laying chain, in which the chain bodies provided with guiding mandrels are interconnected by connectors adapted respectively to be received by the tooth spaces of toothed gear rings respectively associated with the two chains of the twin chain. The two chains are so offset relative to each other in the longitudinal direction of the two chains that the teeth of one of the toothed gear rings are in alignment with the tooth spaces of the other one of the toothed gear rings.

5 Claims, 3 Drawing Figures

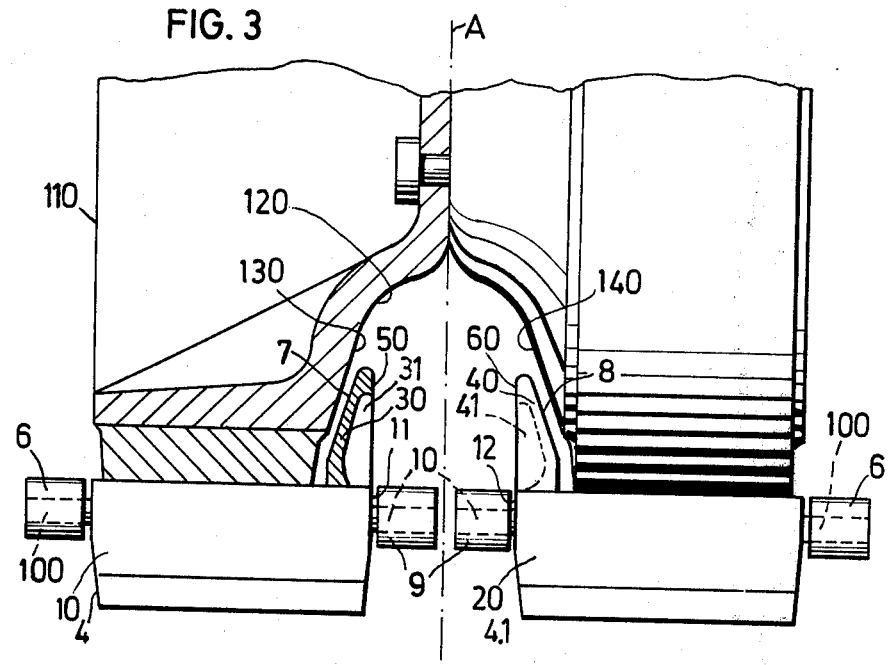

TWIN TRACK LAYING CHAIN

The present invention relates to a twin track laying chain the chain link bodies of which provided with guiding mandrels are coupled to each other by connectors between which driving gear rings extend. With an armored car vehicle there has become known a twin track laying chain in which the individual chain bodies are in alignment with each other.

It is an object of the present invention to provide a twin track laying chain arrangement with a highly satisfactory side guiding.

This object and other objects and advantages of the invention will appear more clearly from the following specification in connection with the accompanying drawings in which:

FIG. 3 is a section taken along the line III—III of FIG. 1.

The present invention is characterized primarily in that the track laying chains are so offset with regard to each other that the teeth of one driving gear ring are in alignment with the tooth spaces of the other driving gear ring. In this way, the links of one chain will always be located during operation of the chain in the spaces between two links of an adjacent chain so that for the twin track laying chain in the side projection an arrangement will be encountered in which the parts cover each other whereby a closed supporting surface will be realized. In addition to the improved lateral guiding, also the advantage of a twin track laying chain will be obtained which is characterized by a quiet operation. In this connection it should be noted that the tread rollers will not at the same time roll over the gap from chain link to chain link.

It is a further object of the invention for the twin track laying chain of the above mentioned type to provide a symmetrical chain guiding. This object has been realized by a guiding mandrel which is located within the region of a lateral flank of the chain body. As a result thereof, according to a further development of the invention, chain bodies arranged adjacent to each other can be provided with guiding mandrels respectively located opposite to each other so that a tread roller can have the width of the twin track laying chain and may be provided with a recess symmetrically arranged about a central plane and centering the two guiding mandrels. These guiding mandrels, due to the track laying chains offset to each other and thus due to their alternate engagement with the tread roller will bring about an improvement in the quietness of the movement of the twin track laying chain.

Figure 1:
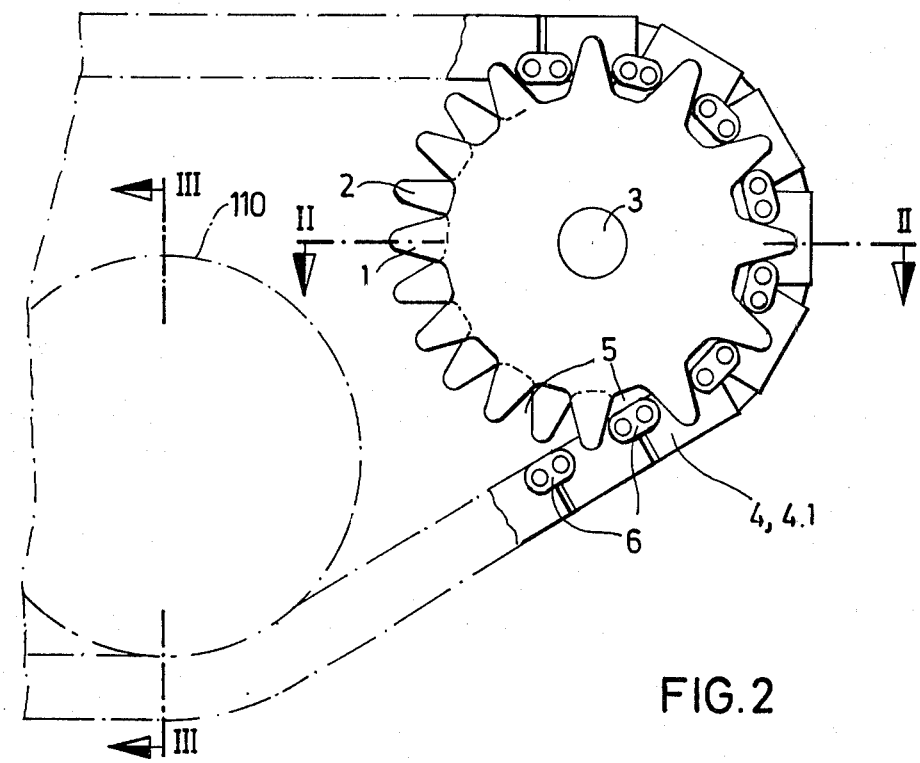
FIG. 1 is a side view of a twin track laying chain according to the invention.
Figure 2:
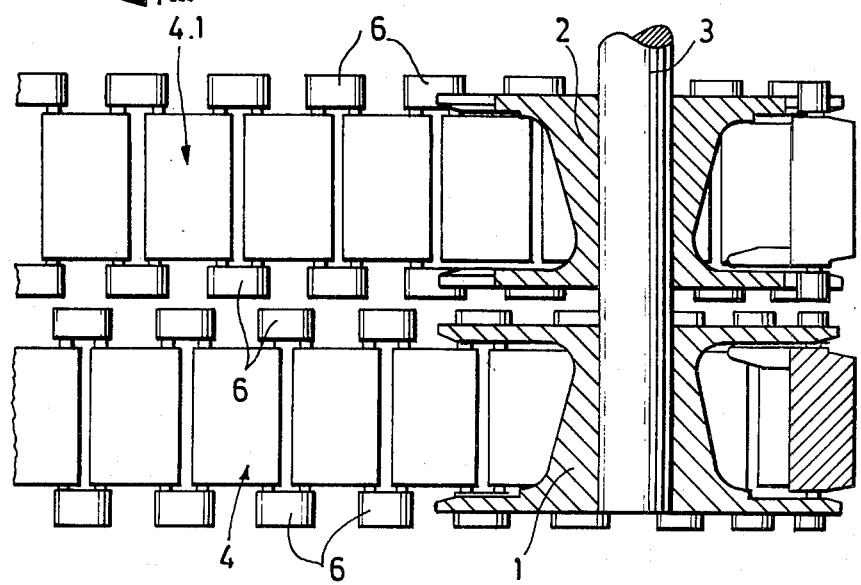
FIG. 2 is a section taken along the line II—II of FIG. 1, without the tread roller indicated by a dot-dash circle in FIG. 1.

Referring now to the drawings in detail, the driving gear rings 1 and 2 (FIG. 2) which are offset with regard to each other are arranged on a shaft 3 and drive a twin track laying chain 4, 4.1. The twin track laying chain is according to FIG. 2 designed as a connector track chain type. The tooth spaces 5 of the driving gear rings 1 and 2 receive the connectors 6.

The side jaws 50, 60 are flush with the side flanks 11, 12 of the chain bodies 10, 20. At those sides of the guiding mandrels 30, 40 which face away from the side jaws 50, 60, there are provided guiding jaws 7, 8. Arranged in said side jaws 50, 60 are recesses 31, 41 for reducing the weight.

The chain bodies 10, 20 are in a manner known per se coupled to each other by connectors 6 which are connected to bolts 100 of the chain bodies 10, 20.

A two-sectional tread roller 110 is provided with a circumferential recess 120 which is symmetrically arranged about its central plane A. This recess 120, by means of its surfaces 130, 140 centers the guiding mandrels 30, 40 and twin track laying chain 4, 4.1.

It is, of course, to be understood, that the present invention is, by no means, limited to the specific showing in the drawings, but also comprises any modifications within the scope of the appended claims.

What we claim is:

1. In combination with a first and a second toothed driving gear axially aligned with regard to each other, a twin track laying chain which includes: a first track laying chain, a second track laying chain arranged in the same plane as and parallel to said first track laying chain, each of said track laying chains comprising chain link bodies with guiding means and also comprising connectors respectively interconnecting said chain link bodies of the pertaining chain, the connectors of said first chain being drivingly receivable by the tooth spaces of said first driving gear, the connectors of said second chain being drivingly receivable by the tooth spaces of said second driving gear, said first and second chains being offset relative to each other so that the teeth of said first driving gear are in alignment with the tooth spaces of said second driving gear, said guiding means being formed by guiding mandrels arranged on those sides of said chain bodies which face each other, so that said guiding mandrels face each other in spaced relationship to each other, and tread roller means extending at least approximately over the width of both said first and said second chains, and at both sides of its central plane being provided with symmetrical recesses for centering said guiding mandrels of said two chains.

2. An arrangement according to claim 1, in which said guiding means of said chain link bodies are formed by guiding mandrels within the range of a lateral flank of said chain link bodies.

3. An arrangement according to claim 1, in which the innermost faces of said guiding mandrels which face each other are substantially flush with the respective adjacent side flanks of the pertaining chain bodies.

4. An arrangement according to claim 1, in which each of said guiding mandrels has one and only one inclined surface and in which said recesses respectively have correspondingly inclined surfaces for cooperation with said first mentioned inclined surfaces of said guiding mandrels.

5. An arrangement according to claim 1, in which those faces of said guiding mandrels of both of said chains which face each other are provided with recess means, the recess means of one chain facing the recess means of the other chain.

* * * * *